United States Patent [19]

Farkas

[11] 4,400,192

[45] Aug. 23, 1983

[54] APPARATUS AND METHOD FOR GENERATING CLOCK PULSES FROM A POWER SELSYN MULTIPLE MOTOR DRIVE SYSTEM FOR A GLASSWARE FORMING MACHINE

[75] Inventor: Daniel S. Farkas, Toledo, Ohio

[73] Assignee: Owens-Illinois, Inc., Toledo, Ohio

[21] Appl. No.: 329,363

[22] Filed: Dec. 10, 1981

[51] Int. Cl.³ .............................................. C03B 9/40
[52] U.S. Cl. ........................................ 65/29; 65/163; 318/692
[58] Field of Search ..................... 65/29, 163; 318/692

[56] References Cited

U.S. PATENT DOCUMENTS

| | | | |
|---|---|---|---|
| 3,593,095 | 7/1971 | Davis | 318/692 |
| 4,145,204 | 3/1979 | Farkas et al. | 65/163 X |
| 4,145,205 | 3/1979 | Farkas et al. | 65/163 X |

Primary Examiner—Arthur D. Kellogg
Attorney, Agent, or Firm—Gerald T. Welch; Myron E. Click; David H. Wilson

[57] ABSTRACT

An apparatus and method for generating clock pulses to an electronically controlled glassware forming machine from the variable frequency power present in a power selsyn multiple motor drive system is disclosed. The frequency of the power present in the selsyn rotor windings is subtracted from the frequency of the power present in the selsyn stator windings to generate a difference frequency signal. The difference frequency signal has a frequency which is directly proportional to the speed of the rotating selsyn rotors. The difference frequency signal can be scaled to provide a desired number of clock pulses and reset pulses per machine cycle.

19 Claims, 5 Drawing Figures

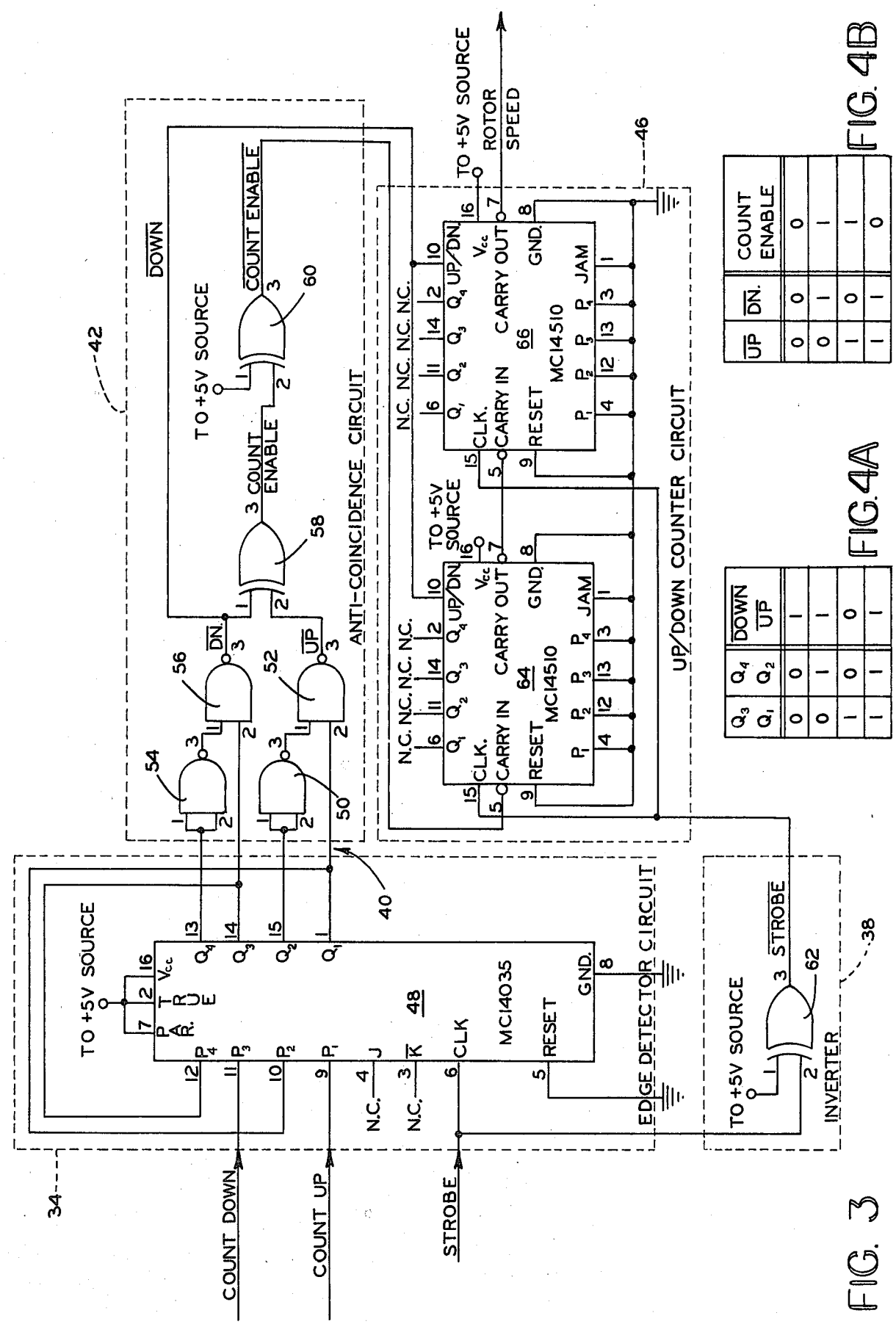

APPARATUS AND METHOD FOR GENERATING CLOCK PULSES FROM A POWER SELSYN MULTIPLE MOTOR DRIVE SYSTEM FOR A GLASSWARE FORMING MACHINE

BACKGROUND OF THE INVENTION

1. Field of the Invention

The present invention relates in general to electronic timing systems and in particular to an apparatus and method for generating clock pulses from a power selsyn multiple motor drive system for a glassware forming machine.

2. Description of the Prior Art

The individual section (IS) glassware forming machine is well known and includes a plurality of sections, each having means for forming glassware articles in a timed predetermined sequence of steps. Typically, the sections are fed from a single source of molten glass. The source forms gobs of molten glass which are distributed to the individual sections. The sections are operated in synchronism at a relative phase difference such that one section is receiving a gob while another section is delivering a finished glassware article to a conveyor and one or more other sections are performing various ones of the intermediate forming steps.

The forming means in each individual section are typically operated by pneumatic motors or actuators. In early prior art machines, these pneumatic motors are controlled by a valve block which, in turn, is controlled by a timing drum. The timing drum for each section is driven from a line shaft which synchronizes all parts of the machine. Manually adjustable cams are positioned on the timing drum for actuating the valves in the valve block. Relative timing between the various forming means in each section can be adjusted by loosening, moving, and tightening the cams as the drum rotates.

Later prior art machines utilize an electronic control means to synchronize the operation of the individual sections. The electronic control means includes a master unit which is responsive to a clock pulse generator and to a reset pulse generator, both of which are driven by a line shaft. The master unit generates reset signals to a separate control circuit for each of the individual sections. Each control circuit includes a pulse counter responsive to the clock pulses and the reset pulses for counting the degrees of the section cycle. Each individual circuit includes forty-eight, three-decade thumbwheel switches for setting the degree of rotation of the machine thereon at which associated control signals are generated. Thus, each particular function of the glassware forming cycle is controlled by one of the thumbwheel switches. Such a control system is disclosed in U.S. Pat. No. 3,762,907.

Power selsyn multiple motor drive systems have been utilized in glassware forming machines to synchronize the gob feeder with the various forming means in each individual section. For example, U.S. Pat. No. 3,305,341 discloses a timing system for an IS glassware forming machine. A transmitter selsyn is driven by a motor which runs at a predetermined speed as it drives the gob feeder shears and gob scoop. A receiver selsyn has a rotor which is electrically connected to the rotor of the transmitter selsyn and is mechanically connected to drive the timing shaft and the take-out conveyor. In another type of glassware forming machine, the transmitter selsyn is mechanically driven by a motor which establishes the machine speed. The rotor of the transmitter selsyn is electrically connected to a first receiver selsyn which mechanically drives the timing shaft and the take-out conveyor and a second receiver selsyn which mechanically drives the gob feeder shears and gob scoop.

Since the selsyns are operated synchronously with respect to each other, it is desirable to generate clock signals to the electronic control means of the glassware forming machine based upon the synchronized speed of the receiver selsyns. To accomplish this, several types of electro-mechanical means, such as shaft encoders and proximity detectors, have been utilized to generate clock pulses at a rate proportional to the speed of the receiver selsyns. However, such electro-mechanical systems are unreliable, especially at low selsyn speeds, because variations in the amount of the load placed on the receiver rotors may cause false clock pulses to be generated.

U.S. Pat. Nos. 4,145,204 and 4,145,205 disclose timing pulse generators responsive to the frequency of the electrical power source connected to the drive motors for glassware forming machines. Such timing pulse generators require that the variable frequency of the power source be directly proportional to the rotor speed, such as in a power inverter drive system. However, when power selsyns are driven in the same direction of rotation as that of the primary magnetic field, as is the usual method of operation, the variable frequency of the power present in the rotor windings is inversely proportional to the speed of the rotors. Hence, the timing pulse generators of the prior art cannot be utilized on glassware forming machines operated by a power selsyn multiple motor drive system.

SUMMARY OF THE INVENTION

The present invention relates to an apparatus and method for generating clock pulses to an electronically controlled glassware forming machine from the variable frequency power present in a power selsyn multiple motor drive system. The frequency of the power present in the selsyn motor windings is subtracted from the frequency of the power present in the selsyn stator windings to generate a difference frequency signal which is directly proportional to the speed of the rotating rotors. The difference frequency signal can be scaled to provide a desired number of clock pulses per machine cycle.

More specifically, the stator power frequency signal and the rotor power frequency signal are applied to respective phase locked loops, which loops scale the power frequency signals by a suitable factor. The scaled frequency signals are then applied to an edge detector circuit which is clocked by the leading edge of a strobe signal. The edge detector defines each frequency signal as a plurality of pulses, each pulse having a duration equal to the duration of the strobe signals. The output signals of the edge detector circuit are then applied to an anti-coincidence circuit. The anti-coincidence circuit generates an output signal if and only if one of the two edge-detected frequency signals changes from low to high between strobe pulses. If neither or both of the frequency signals change from low to high prior to the leading edge of the next strobe pulse, no output signal will be generated by the anti-coincidence circuit.

The output signal of the anti-coincidence circuit is inverted and fed to a carry in input of an up/down counter circuit. The counter is clocked on the trailing edge of the strobe pulse. The counter counts up if the anti-coincidence circuit output signal is due to a low-to-high transition in to the stator power frequency signal and counts down if the anti-coincidence circuit output signal is due to a low-to-high transition in the rotor power frequency signal. The carry out signal of the last stage of the counter represents the difference between the stator and rotor scaled power frequency signals. The frequency of the output signal of the counter is directly proportional to the speed of the receiver selsyns and can be fed to a timing pulse generator to generate a predetermined number of clock pulses per machine cycle.

It is an object of the present invention to provide a circuit which generates clock pulses from a power selsyn multiple motor drive system.

It is another object of the present invention to provide a circuit which generates clock pulses based upon the difference between the frequencies of the power present in the selsyn stator and rotor windings of a motor drive system.

It is a further object of the present invention to improve the performance of a glassware forming machine.

Other objects and advantages of the present invention will become apparent to those skilled in the art from the following detailed description of the preferred embodiment, when read in light of the accompanying drawings.

BRIEF DESCRIPTION OF THE DRAWINGS

FIG. 3 is a schematic diagram of a portion of the power selsyn synchronization circuit of FIG. 2; and FIGS. 4A and 4B are truth tables for two portions of the power selsyn synchronization circuit of FIG. 3.

DETAILED DESCRIPTION OF THE PREFERRED EMBODIMENT

Figure 1:
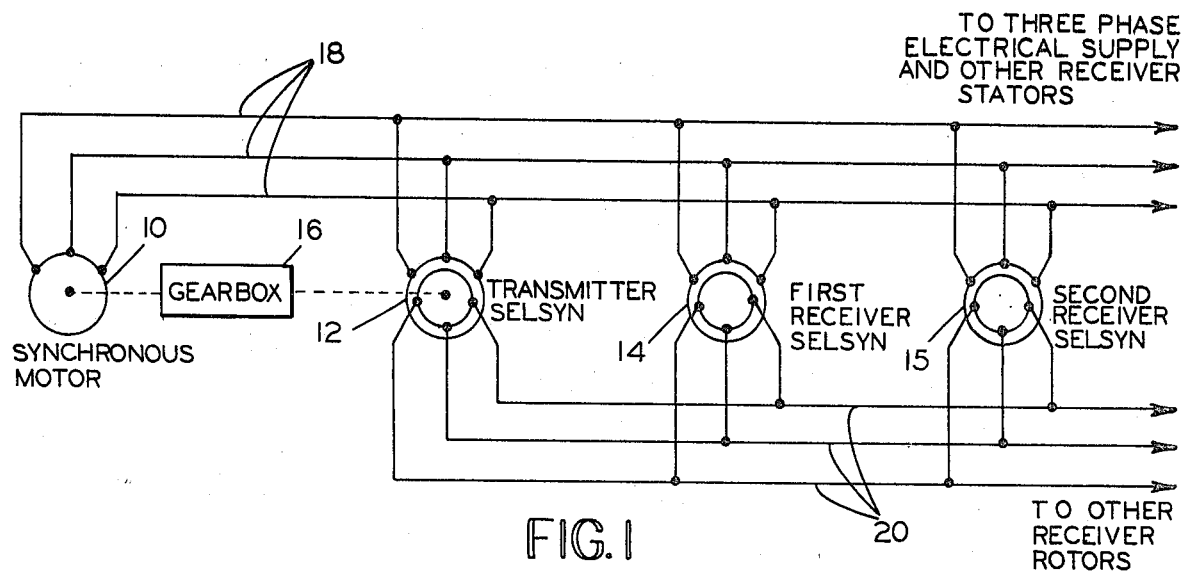
FIG. 1 is a simplified schematic diagram of a portion of a power selsyn multiple motor drive system for a glassware forming machine.

Referring now to the drawings, there is illustrated in FIG. 1 a simplified schematic diagram of a portion of a power selsyn multiple motor drive system for a glassware forming machine. The drive system includes a synchronous motor 10, a transmitter selsyn 12, and a pair of receiver selsyns 14 and 15. Each of the receiver selsyns 14 and 15 is mechanically connected to drive a particular one of the mechanisms of the glassware forming machine. The synchronous motor 10 is mechanically connected through a variable speed gearbox 16 to the transmitter selsyn 12. The gearbox 16 allows an operator to vary the speed at which the transmitter selsyn 12 will be driven by the synchronous motor 10.

If the drive system shown in FIG. 1 were utilized in a glassware forming machine in which the machine mechanisms are driven by the selsyn receivers, the first receiver selsyn 14 could be connected to drive the timing drum shaft and the take-out conveyor and the second receiver selsyn 15 could be connected to drive the gob feeder shears and the gob scoop. If the drive system were utilized with the machine shown in U.S. Pat. No. 3,305,341, the synchronous motor 10 could be utilized to drive the gob feeder shears and the gob scoop. The first receiver selsyn 14 could be utilized to drive the timing shaft and the take-out conveyor and the second receiver selsyn 15 could be eliminated.

The synchronous motor 10 is connected over a first set of lines 18 to a source of three-phase electrical power (not shown). The frequency of the three-phase power is constant and the synchronous motor 10 will be driven at a constant speed which is proportional thereto. The primary or stator windings of the transmitter selsyn 12 and each of the receiver selsyns 14 and 15 are interconnected over the first set of lines 18. The secondary or rotor windings of the transmitter selsyn 12 and each of the receiver selsyns 14 and 15 are interconnected over a second set of lines 20.

The three-phase electrical power connected to the stator windings produces rotating magnetic fields in the transmitter and receiver selsyns 12, 14, and 15. When no load is applied to the receiver selsyns 14 and 15, the rotor of the transmitter selsyn 12 and the rotors of the receiver selsyns 14 and 15 will rotate in exact correspondence. No secondary currents will be induced in the rotor windings or in the second set of lines 20 and, hence, no synchronizing torque will be generated. However, if a load is applied to one or more of the receiver selsyns 14 and 15, there will be an angular lag or "slip" between the transmitter selsyn 12 and the receiver selsyns 14 and 15. Circulating secondary currents will be induced in the rotor windings and in the second set of lines 20, which currents will react with the primary flux of the rotating magnetic fields to produce a synchronizing torque which tends to keep the rotors in synchronism with each other. Thus, the various mechanisms in the glassware forming machine operated by the receiver selsyns 14 and 15 will be operated synchronously with respect to each other.

It will be appreciated that the frequency of the power present in the first set of lines 18, which lines 18 are connected to the stator windings of the transmitter selsyn 12 and the receiver selsyns 14 and 15, will always remain equal to the frequency of the three-phase power source, regardless of the load placed on the receiver selsyns 14 and 15. However, the frequency of the power present in the second set of lines 20, which lines 20 are connected to the rotors of the transmitter selsyn 12 and the receiver selsyns 14 and 15, will vary inversely with the speed of the rotors of the receiver selsyns 14 and 15. For example, when the rotors of the receiver selsyns 14 and 15 are rotating at the maximum or synchronous speed of the transmitter selsyn 12, the frequency of the power present in the second set of lines 20 will be zero. Similarly, if the rotors of the receiver selsyns 14 and 15 are locked in position and not rotating at all, the frequency of the power present in the second set of lines 20 will be equal to the frequency of the three-phase power present in the first set of lines 18. If there is any angular lag or "slip" as discussed above, the frequency of the power present in the second set of lines 20 will be between zero and the three-phase power frequency. The lines 18 and 20 can be connected to other receiver selsyns if it is desired to operate two or more machines in synchronism.

Figure 2:
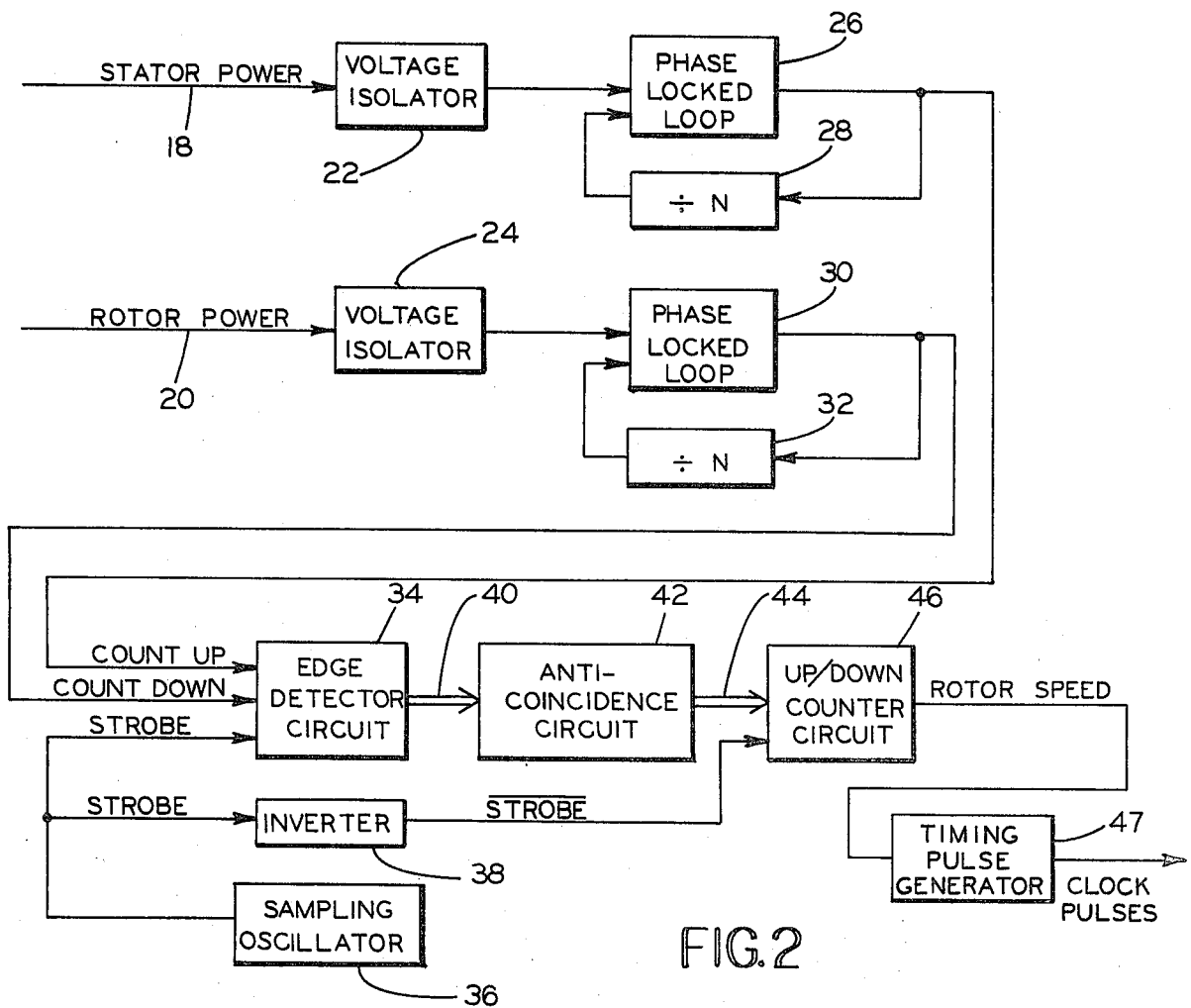
FIG. 2 is a block diagram of a power selsyn synchronization circuit in accordance with the present invention.

FIG. 2 illustrates a block diagram of a power selsyn synchronization circuit in accordance with the present invention. The circuit can be utilized to generate clock signals to an electronic control means (not shown) of the type shown in U.S. Pat. No. 4,152,134 for the glassware forming machine. The stator power present in the first set of lines 18 is fed to a first voltage isolator 22. Similarly, the rotor power present in the second set of lines 20 is fed to a second voltage isolator 24. The voltage isolating means 22 and 24 are conventional devices which shield sensitive electronic circuitry from potentially destructive high voltages. The voltage isolators 22 and 24 can be Model ILCT-6 multiple channel opto-isolators manufactured by Litronix, Incorporated of Cupertino, California.

The output signals of the voltage isolators 22 and 24 consist of logical high signals and logical low signals which alternate at frequencies equal to the input stator and rotor power frequencies, respectively. Thus, the signal representing the stator power present in the first line 18 is passed through the voltage isolator 22 to an input of a first phase locked loop 26. The output signal of the phase locked loop 26 is fed through a frequency dividing circuit 28 to the other input of the phase locked loop 26. The frequency dividing circuit 28 has a frequency division factor of N.

The signal representing the rotor power present in the second line 20 is similarly passed through the voltage isolator 24 to a second phase locked loop 30 and a second frequency dividing circuit 32. The phase locked loop means 26 and 30 are more fully described in U.S. Pat. Nos. 4,145,204 and 4,145,205. The phase locked loops 26 and 30 and the dividing circuits 28 and 32 are scaling means which can be utilized to scale the stator and rotor power frequency signals by a suitable factor. For convenience, as will be explained in greater detail below, the phase locked loops 26 and 30 will normally be set to multiply the stator and rotor power frequency signals by a factor of one hundred. However, it may be desirable to utilize other scaling factors for different applications.

The output signal of the first phase locked loop 26, representing the scaled frequency of the stator power, is fed over a COUNT UP line to an edge detector circuit 34. The output signal of the second phase locked loop 28, representing the scaled frequency of the rotor power, is fed over a COUNT DOWN line to the edge detector circuit 34. A sampling oscillator 36 generates strobe signals at a predetermined frequency to the edge detector circuit 34 over a STROBE line. The STROBE line is also connected to an inverter 38 which generates inverted strobe signals over a $\overline{\text{STROBE}}$ line. As will be explained below, the edge detector circuit 34 defines each of the power frequency signals as a plurality of power signal pulses, each pulse having a duration equal to the duration of the strobe pulses on the STROBE line.

The output signals of the edge detector circuit 34 are fed over a plurality of lines 40 to an anti-coincidence circuit 42. The anti-coincidence circuit 42 generates an output signal if and only if one of the scaled frequency power signal input pulses changes from low to high between strobe pulses. If neither or both of the input signals change from low to high prior to the leading edge of the next strobe pulse, no output signal will be generated by the anti-coincidence circuit 42.

Output signals from the anti-coincidence circuit 42 are fed over a plurality of lines 44 to an up/down counter circuit 46. The inverted strobe signals generated by the inverter 38 are fed over the $\overline{\text{STROBE}}$ line to the up/down counter 46. The up/down counter 46 counts up if the output signal of the anti-coincidence circuit 42 is due to a low-to-high transition in the stator power frequency signal and counts down if the output signal of the anti-coincidence circuit 42 is due to a low-to-high transition in the rotor power frequency signal.

Thus, the frequency of the output signal of the up/down counter 46 is the difference between the stator and rotor power frequency signals. This difference frequency signal is directly proportional to the speed of the rotors.

The output signal of the up/down counter 46 can be fed over a ROTOR SPEED line to a timing pulse generator 47 such as that disclosed in U.S. Pat. Nos. 4,145,204 and 4,145,205. The ROTOR SPEED line can be connected to the inverter power input shown in FIG. 3 or the F(LVO) input shown in FIG. 4 of the timing pulse generators shown in said patents. The timing pulse generator 47 scales the rotor speed signal to generate a desired number of clock pulses to an electronic control means (not shown) of the glassware forming machine. Typically, the timing pulse generator will generate three hundred sixty clock pulses per machine cycle and one reset pulse per three hundred sixty clock pulses. The clock and reset pulses are utilized by the electronic control means to cyclically control the forming means of the glassware forming machine in a timed predetermined sequence of steps for forming glassware.

Referring now to FIG. 3, there is illustrated a schematic diagram of a portion of the power selsyn synchronization circuit of FIG. 2. The signals on the COUNT UP line, the COUNT DOWN line, and the STROBE line are fed to the edge detector circuit 34. The edge detector circuit 34 can be a Model MC14035 four bit parallel shift register 48 manufactured by Motorola Semiconductor Products, Inc. of Phoenix, Ariz. The STROBE line is connected to the clock input 48-6 of the shift register 48. The COUNT UP line is connected to the $P_1$ data input 48-9. The $Q_1$ data output 48-1 is connected to the $P_2$ data input 48-10. The COUNT DOWN line is connected to the $P_3$ data input 48-11. The $Q_3$ data output 48-14 is connected to the $P_4$ data input 48-12.

The edge detector circuit 34 is clocked by the leading or positive-going edge of the strobe pulse signals generated by the sampling oscillator 36 over the STROBE line. As mentioned above, the edge detector circuit 34 defines each frequency signal as a plurality of power signal pulses, each pulse having a duration equal to the duration of the strobe signal. The frequency of the strobe signal is preferably set at least three orders of magnitude greater than the higher of the two input power frequency signals to reduce phase error. For example, if the frequency of the power applied by the three-phase source to the stator windings of the transmitter and receiver selsyns 12, 14, and 15 is sixty hertz, the frequency of the power induced in the rotor windings of the transmitter and receiver selsyns 12, 14, and 15 will vary from zero to sixty hertz. At these input frequencies, it has been found desirable to generate strobe signals to the edge detector circuit 34 at a frequency of one hundred kilohertz.

From the foregoing description, it will be appreciated that the $Q_1$ data output 48-1 generates a signal representing the latest pulse generated by the shift register 48 in response to the stator power frequency signal on the COUNT UP line. The $Q_2$ data output 48-15 generates a signal representing the immediately preceding pulse generated by the shift register 48 in response to the signal on the COUNT UP line. Similarly, the $Q_3$ data output 48-14 generates a signal representing the latest pulse and the $Q_4$ data output 48-13 generates a signal representing the immediately preceding pulse generated by the shift register 48 in response to the rotor power frequency signal on the COUNT DOWN line. The four data outputs 48-1, 48-15, 48-14, and 48-13 are connected over the plurality of lines 40 to the anti-coincidence circuit 42.

The anti-coincidence circuit 42 includes comparator means for generating a signal when the positive-going edge of either of the signals on the COUNT UP and COUNT DOWN lines is detected. The comparator means compares the latest pulse of either line with the immediately preceding pulse on the same line and generates a signal when the preceding pulse is low and the latest pulse is high. In other words, the comparator means will generate a signal when either input signal changes from low to high.

The comparator means for the stator power frequency signals on the COUNT UP line can be two NAND gates 50 and 52. Similarly, the comparator means for the rotor power frequency signals on the COUNT DOWN line can be two NAND gates 54 and 56. In the illustrated embodiment, the $Q_2$ data output 48-15 is fed to both inputs 50-1 and 50-2 of the first NAND gate 50. The output 50-3 of the first NAND gate 50 is fed to an input 52-1 of the second NAND gate 52. The $Q_1$ data output 48-1 is connected directly to another input 52-2 of the second NAND gate 52. The output 52-3 of the second NAND gate 52 is generated over an $\overline{UP}$ line. Similarly, the $Q_4$ data output 48-13 is fed to both inputs 54-1 and 54-2 of the third NAND gate 54. The output 54-3 of the third NAND gate 54 is fed to an input 56-1 of the fourth NAND gate 56. The $Q_3$ data output 48-14 is fed directly to another input 56-2 of the fourth NAND gate 56. The output 56-3 of the fourth NAND gate 56 is generated over a $\overline{DOWN}$ line.

FIG. 4A illustrates a truth table for the above-discussed comparator means of the anti-coincidence circuit 42. Only when the stator power frequency signal changes from low to high, i.e., when the $Q_1$ data output signal is high and the $Q_2$ data output signal is low, will the signal on the $\overline{UP}$ line be low. Similarly, the signal on the $\overline{DOWN}$ line will be low only when the rotor power frequency signal changes from low to high, i.e., when the $Q_3$ data output signal is high and the $Q_4$ data output signal is low.

The anti-coincidence circuit 42 also includes anti-coincidence means for generating a signal when one and only one of the power frequency signals changes from low to high. In other words, the anti-coincidence means generates a signal only when the signals on the $\overline{UP}$ and $\overline{DOWN}$ lines are different. The anti-coincidence means can be two exclusive OR gates 58 and 60. The $\overline{UP}$ line connects the output 52-3 of the second NAND gate 52 to an input 58-2 of the first exclusive OR gate 58. The $\overline{DOWN}$ line connects the output 56-3 of the fourth NAND gate 56 to the other input 58-1 of the first exclusive OR gate 58. The output 58-3 of the first exclusive OR gate 58 is connected over a COUNT ENABLE line to an input 60-2 of the second exclusive OR gate 60. The other input 60-1 is connected to a logical high voltage input, such as a positive five volt source (not shown), causing the second exclusive OR gate 60 to function as an inverter. The output 60-3 of the second exclusive OR gate 60 is generated over a $\overline{\text{COUNT ENABLE}}$ line to the up/down counter circuit 46. The $\overline{DOWN}$ line is also fed directly to the up/down counter circuit 46.

FIG. 4B illustrates a truth table for the first portion of the above-discussed anti-coincidence means of the anti-coincidence circuit 42. Only when the signals from the comparator means are different, i.e., when just one of the power frequency signals has changed from low to high, will a high signal be generated over the COUNT ENABLE line. If neither or both of the power frequency signals has changed from low to high, a low signal will be generated over the COUNT ENABLE line.

The strobe signals generated by the sampling oscillator 36 are fed over the STROBE line to the inverter 38. In the illustrated embodiment, the STROBE line is connected to an input 62-2 of a third exclusive OR gate 62. The other input 62-1 is connected to a logical high voltage input, such as the positive five volt source, causing the exclusive OR gate 62 to operate as an inverter. The output 62-3 of the third exclusive OR gate 62 is fed over the $\overline{STROBE}$ line to the up/down counter circuit 46. Since the strobe pulses on the $\overline{STROBE}$ line are inverted with respect to the strobe pulses on the STROBE line, the up/down counter circuit 46 will be clocked on the trailing or negative-going edge of the pulses generated by the sampling oscillator 36. The up/down counter circuit 46 is clocked on the trailing edge of the strobe pulses to avoid errors caused by propagation delays through the various gates described above.

The signals on the $\overline{DOWN}$ line, the $\overline{\text{COUNT ENABLE}}$ line, and the $\overline{STROBE}$ line are fed to the up/down counter circuit 46. The up/down counter circuit 46 can be a pair of cascaded Model MC14510 binary coded decimal up/down counters 64 and 66 manufactured by Motorola Semiconductor Products, Inc. The $\overline{DOWN}$ line is connected to the up/down inputs 64-10 and 66-10 of the counters 64 and 66. The $\overline{STROBE}$ line is connected to the clock inputs 64-15 and 66-15 of the counters 64 and 66. The $\overline{\text{COUNT ENABLE}}$ line is connected to the inverting carry in input 64-5 of the first counter 64. The inverting carry out output 64-7 of the first counter 64 is connected to the inverting carry in input 66-5 of the second counter 66. The inverting carry out output 66-7 of the second counter 66 is fed over a ROTOR SPEED line to the timing pulse generator (not shown). All of the data inputs of both counters 64 and 66 are connected to a logical low voltage, such as ground potential.

In the Model MC14510 up/down counter integrated circuits 64 and 66, the carry in inputs 64-5 and 66-5 and the carry out outputs 64-7 and 66-7 are all designed to invert the signal passing therethrough. Thus, the signals on the COUNT ENABLE line must be inverted before being fed over the $\overline{\text{COUNT ENABLE}}$ line to the carry in input 64-5 to ensure that the first counter 64 is incremented or decremented only when one of the two power frequency signals changes from low to high.

The signal on the $\overline{DOWN}$ line will determine whether the count is incremented or decremented by the signal on the $\overline{\text{COUNT ENABLE}}$ line. If the signal on the $\overline{\text{COUNT ENABLE}}$ line is due to a low-to-high transition in the stator power frequency, the signal on the $\overline{DOWN}$ must be high and the counter 64 will be incremented. Conversely, if the signal on the $\overline{\text{COUNT ENABLE}}$ line is due to a low-to-high transition in the rotor power frequency, the signal on the $\overline{DOWN}$ line must be low and the counter 64 will be decremented.

Since the counter 64 is a binary coded decimal counter, an overflow output signal will be generated whenever the count exceeds nine increments. When an overflow output signal occurs, the signal from the inverting carry out output 64-7 will change from high to low for one strobe pulse. However, since the carry in input 66-5 of the second counter 66 is also an inverting input, the second counter 66 will be incremented or decremented as described above.

The frequency of the signal from the inverting carry out output 66-7 on the ROTOR SPEED line represents the difference between the stator power scaled frequency and the rotor power scaled frequency, the difference being divided by the modulus of the up/down counter 46. The modulus of the up/down counter circuit 46 must be sufficiently large as to reduce the non-accumulative error of the counter circuit 46. Since the up/down counter circuit 46 is a two stage binary coded decimal counter, the modulus of the up/down counter 46 is one hundred. As described above, the phase locked loops 26 and 30 multiplied the stator and rotor power frequency signals by a factor of one hundred. Therefore, the frequency of the signal on the ROTOR SPEED line is exactly equal to the difference between the unscaled stator and rotor power frequency signals, which difference is directly proportional to the speed of the rotating rotors. The rotor speed signal is fed over the ROTOR SPEED line to a timing pulse generator, as described above, to generate clocking signals to the glassware forming machine.

In accordance with the provisions of the patent statutes, the principle and mode of operation of the present invention have been explained and illustrated in its preferred embodiment. However, it must be understood that the present invention can be practiced otherwise than as specifically described and illustrated without departing from its spirit or scope.

What is claimed is:

1. In a glassware forming machine including a plurality of driven mechanisms and a power selsyn multiple motor drive means for driving the mechanisms, the selsyns having interconnected stator windings connected to a source of electrical power and having interconnected rotor windings for synchronously driving the driven mechanisms with the rotors, an apparatus for generating a speed signal having a frequency directly proportional to the speed of the selsyn rotors comprising:

means responsive to the frequency of the power signal in the rotor windings for generating a first output signal having a frequency proportional to the rotor power frequency;

means responsive to the frequency of the power signal in the stator windings for generating a second output signal having a frequency proportional to the stator power frequency; and means responsive to said first and second output signals for generating the speed signal as a difference frequency signal having a frequency which is equal to the difference between the stator and rotor power frequencies.

2. A speed signal generating apparatus in accordance with claim 1 wherein said first and second output signal means include means for scaling the frequencies of the power signals present in the stator and rotor windings by a predetermined amount.

3. A speed signal generating apparatus in accordance with claim 2 wherein said scaling means includes phase locked loop means and frequency dividing means for scaling the frequencies of the power signals by said predetermined amount.

4. A speed signal generating apparatus in accordance with claim 2 wherein said scaling means multiply the frequencies of the power signals by a factor of 100.

5. A speed signal generating apparatus in accordance with claim 1 wherein said difference frequency signal means includes means for subtracting the frequency of the power signal in the rotor windings from the frequency of the power signal in the stator windings to generate said difference frequency signal.

6. A speed signal generating apparatus in accordance with claim 5 further including voltage isolating means for shielding said means for subtracting from the electrical power in the stator and rotor windings.

7. A speed signal generating apparatus in accordance with claim 6 wherein said voltage isolating means includes an optical voltage isolater having an input connected to one of the rotor and stator windings and an output connected to an input of said difference frequency signal means.

8. A speed signal generating apparatus in accordance with claim 1 wherein said difference frequency signal means includes edge detector means connected to the selsyn rotor and stator windings and strobe pulse generating means for generating a train of strobe pulses each having a predetermined duration to said edge detector means defining each of the power signals as a plurality of pulses, each of said power signal pulses having a duration equal to the duration of said strobe pulses.

9. A speed signal generating apparatus in accordance with claim 8 wherein said edge detector means includes a parallel shift register having a clock input connected to said strobe pulse generating means, a pair of data inputs connected to the selsyn rotor and stator windings, and a plurality of data outputs for said power signal pulses.

10. A speed signal generating apparatus in accordance with claim 8 further including comparator means responsive to said edge detector power signal pulses for generating an output signal when either of the power signals changes from a low to a high magnitude between successive ones of said strobe pulses.

11. A speed signal generating apparatus in accordance with claim 10 wherein said comparator means includes means for comparing a present one of said edge detector power signal pulses with a preceding one of said edge detector power signal pulses to determine if the magnitude of either of the power signals has changed from low to high.

12. A speed signal generating apparatus in accordance with claim 10 further including anti-coincidence means including said comparator means and responsive to said comparator means output signal for generating an output signal when only one of the power signals changes from a low to a high magnitude between successive ones of said strobe pulses.

13. A speed signal generating apparatus in accordance with claim 12 wherein said anti-coincidence means includes an exclusive OR gate having a pair of inputs connected to a pair of outputs of said comparator means and an output connected to generate said anti-coincidence output signal.

14. A speed signal generating apparatus in accordance with claim 12 wherein said difference frequency signal means includes an up/down counter means responsive to said anti-coincidence means output signal and said comparator means output signal for incrementing a count total when the stator power signal changes from low to high and for decrementing said count total when the rotor power signal changes from low to high.

15. A speed signal generating apparatus in accordance with claim 14 wherein said up/down counter means includes a pair of cascaded binary coded decimal up/down counters.

16. In a glassware forming machine including a plurality of driven mechanisms, a power selsyn multiple motor drive means for driving the mechanisms, the selsyns having interconnected stator windings connected to a source of three phase electrical power and having interconnected rotor windings for synchronously driving the driven mechanisms, and an electronic control means responsive to clock signals for cyclically controlling forming means in a timed predetermined sequence of steps for forming glassware, an apparatus for generating the clock signals to the electronic control means comprising:

means for subtracting the frequency of the power signal present in the rotor windings from the frequency of the power signal present in the stator windings to generate a difference frequency signal; and timing pulse generator means responsive to said difference frequency signal for generating the clock signals to the electronic control means.

17. A clock signal generating apparatus in accordance with claim 16 wherein said frequency subtracting means includes means for scaling the frequencies of the power signals by a predetermined amount, voltage isolating means for shielding said scaling means from the power signals, edge detector means responsive to said scaling means for defining each of the power frequency signals as a plurality of pulses, anti-coincidence circuit means responsive to said edge detector means for generating an output signal when only one of the power signals changes from low to high, and up/down counter means responsive to said anti-coincidence circuit means output signal for incrementing a count total when the stator power frequency signal changes from low to high and for decrementing said count total when the rotor power frequency signal changes from low to high, said count total being said difference frequency signal.

18. A method of generating a speed signal for a glassware forming machine including a plurality of driven mechanisms and a power selsyn multiple motor drive means, the selsyns having interconnected stator windings connected to a source of electrical power and having interconnected rotor windings for synchronously driving the driven mechanisms, the method of generating the speed signal having a frequency directly proportional to the speed of the selsyns comprising the steps of:

(a) generating a first signal representing the frequency of the power signal present in the rotor windings;

(b) generating a second signal representing the frequency of the power signal present in the stator windings; and (c) subtracting said first signal from said second signal to generate the speed signal as a difference frequency signal having a frequency which is equal to the difference between the stator and rotor power frequencies.

19. A method of generating clock signals for a glassware forming machine including a plurality of forming means for forming articles of glassware, a plurality of driven mechanisms, and a power selsyn multiple motor drive means for driving the driven mechanisms, the selsyns having interconnected stator windings connected to a source of three phase electrical power and having interconnected rotor windings for synchronously driving the driven mechanisms, and an electronic control means responsive to the clock signals for cyclically controlling the forming means in a timed predetermined sequence of steps for forming glassware, the method of generating the clock signals to the electronic control means comprising the steps of:

(a) scaling each of the frequencies of the power signals by a predtermined amount;

(b) defining each of said scaled power signals as a plurality of pulses;

(c) comparing one of each of said plurality of power signal pulses with a preceding one of said same plurality of pulses to determine if either of the power signals has changed from low to high;

(d) generating a change signal when only one of the power signals changes from low to high;

(e) incrementing a count total in response to said change signal if the stator power signal changes from low to high and decrementing said count total in response to said change signal if the rotor power signal changes from low to high;

(f) generating difference frequency signals to a timing pulse generator means in response to said count total; and (g) generating clock signals to the electronic control means in response to said difference frequency signals.

* * * * *